(12) United States Patent
Kalavsky

(10) Patent No.: US 12,003,141 B2
(45) Date of Patent: Jun. 4, 2024

(54) ELECTRIC DRIVE MOTOR, WET ROTOR PUMP AND HOUSEHOLD APPLIANCE

(71) Applicant: BSH Hausgeraete GmbH, Munich (DE)

(72) Inventor: Michal Kalavsky, Kosice (SK)

(73) Assignee: BSH Hausgeraete GmbH, Munich (DE)

( * ) Notice: Subject to any disclaimer, the term of this patent is extended or adjusted under 35 U.S.C. 154(b) by 87 days.

(21) Appl. No.: 15/734,640

(22) PCT Filed: May 29, 2019

(86) PCT No.: PCT/EP2019/064073
§ 371 (c)(1),
(2) Date: Dec. 3, 2020

(87) PCT Pub. No.: WO2019/233874
PCT Pub. Date: Dec. 12, 2019

(65) Prior Publication Data
US 2021/0159746 A1 May 27, 2021

(30) Foreign Application Priority Data
Jun. 5, 2018 (DE) .................... 10 2018 208 820.9

(51) Int. Cl.
*H02K 1/27* (2022.01)
*F04D 13/06* (2006.01)
(Continued)

(52) U.S. Cl.
CPC .......... *H02K 1/278* (2013.01); *F04D 13/064* (2013.01); *F04D 13/0686* (2013.01);
(Continued)

(58) Field of Classification Search
CPC ........ H02K 15/02; H02K 1/278; H02K 21/14; H02K 21/16; F04D 29/05; F04D 29/026;
(Continued)

(56) References Cited

U.S. PATENT DOCUMENTS 1,850,395 A * 3/1932 Hughes ..................... B21J 9/025
29/894.362
4,429,245 A * 1/1984 Muller .................. F04D 25/064
29/598
(Continued)

FOREIGN PATENT DOCUMENTS

CN 1330206 A 1/2002
CN 1711423 A 12/2005
(Continued)

*Primary Examiner* — Burton S Mullins
(74) *Attorney, Agent, or Firm* — Laurence A. Greenberg; Werner H. Stemer; Ralph E. Locher

(57) ABSTRACT

An electric drive motor has a stator with at least one electrically energizable stator winding, and a rotor which is mounted in a rotationally driveable manner in the field of the at least one stator winding so as to leave free an annular gap. The motor also has a motor shaft and a magnet carrier which is arranged coaxially in relation to the motor shaft and has at least one permanent magnet which is arranged on an outer periphery of the magnet carrier. The motor shaft and the magnet carrier are of integral design by way of the motor shaft and the magnet carrier being jointly produced from an individual starting metal sheet by shaping to form an integrally shaped rotor body. There is also described a wet-rotor pump and a domestic appliance having an electric drive motor of this kind.

12 Claims, 7 Drawing Sheets

(51) Int. Cl.
*F04D 29/02* (2006.01)
*H02K 1/278* (2022.01)
*H02K 5/128* (2006.01)
*H02K 5/167* (2006.01)
*H02K 7/14* (2006.01)
*H02K 15/03* (2006.01)
*H02K 15/12* (2006.01)

(52) U.S. Cl.
CPC ............ *H02K 5/128* (2013.01); *H02K 5/1675* (2013.01); *H02K 7/14* (2013.01); *H02K 15/03* (2013.01); *H02K 15/12* (2013.01)

(58) Field of Classification Search
CPC ... F04D 29/007; F04D 13/0653; B21D 53/26; B21D 22/06; B21D 31/00
USPC ..... 310/156.26, 265, 156.12, 67 R; 73/379.2
See application file for complete search history.

(56) References Cited

U.S. PATENT DOCUMENTS

| | | | | |
|---|---|---|---|---|
| 5,111,094 | A * | 5/1992 | Patel | H02K 1/278 29/598 |
| 5,174,025 | A * | 12/1992 | Tasaki | H02K 15/03 29/894.362 |
| 5,528,092 | A | 6/1996 | Ohta | |
| 5,528,095 | A * | 6/1996 | Strobl | H02K 1/2733 310/43 |
| 5,619,879 | A * | 4/1997 | Friese | B21D 53/261 72/85 |
| 5,803,618 | A * | 9/1998 | Obara | F16C 33/32 384/512 |
| 5,949,171 | A * | 9/1999 | Horski | F04D 13/064 310/43 |
| 6,477,869 | B2 * | 11/2002 | Heyder | H02K 21/22 68/140 |
| 6,701,603 | B2 * | 3/2004 | Matsuura | H02K 15/14 29/897 |
| 7,131,823 | B2 * | 11/2006 | Kalavsky | F04D 29/047 417/356 |
| 7,728,476 | B2 * | 6/2010 | Yano | H02K 21/16 310/67 R |
| 9,178,394 | B2 | 11/2015 | Asahi et al. | |
| 9,669,445 | B2 * | 6/2017 | Nillies | B21D 53/261 |
| 9,997,970 | B2 | 6/2018 | Ivanak et al. | |
| 10,180,142 | B2 | 1/2019 | Teubel et al. | |
| 2004/0027016 | A1 * | 2/2004 | Bruder | H02K 21/22 310/75 D |
| 2006/0022541 | A1 * | 2/2006 | Ong | H02K 7/003 310/156.31 |
| 2007/0014496 | A1 * | 1/2007 | Engesser | F16C 17/107 384/107 |
| 2012/0313463 | A1 * | 12/2012 | Howell | H02K 1/278 264/261 |
| 2014/0271279 | A1 | 9/2014 | Kuba | |
| 2015/0089986 | A1 | 4/2015 | Nillies | |
| 2016/0149449 | A1 * | 5/2016 | Ivanak | F04D 13/064 310/156.13 |
| 2017/0363084 | A1 | 12/2017 | Burn et al. | |
| 2019/0245397 | A1 | 8/2019 | Ivanak et al. | |

FOREIGN PATENT DOCUMENTS

| | | |
|---|---|---|
| CN | 101814788 A | 8/2010 |
| CN | 202190200 U | 4/2012 |
| CN | 1021844573 A | 12/2012 |
| CN | 104052178 A | 9/2014 |
| CN | 107110159 A | 8/2017 |
| CN | 206681813 U | 11/2017 |
| DE | 10131761 A1 | 1/2003 |
| DE | 10251461 A1 | 5/2004 |
| DE | 102008029515 A1 | 12/2009 |
| DE | 102008040362 A1 | 1/2010 |
| DE | 102014204319 A1 | 9/2014 |
| DE | 102013211573 A1 | 12/2014 |
| DE | 102013223091 A1 | 5/2015 |
| DE | 102014202572 A1 | 8/2015 |
| DE | 102015226133 A1 | 6/2017 |
| DE | 102016219974 B3 | 3/2018 |
| EP | 0081524 B1 | 1/1986 |
| EP | 2696470 A2 | 2/2014 |
| JP | H11166500 A | 6/1999 |
| JP | 2000287430 A | 10/2000 |
| JP | 2001298887 A | 10/2001 |
| JP | 3546207 B1 | 7/2004 |
| JP | 2005299559 A | 10/2005 |
| JP | 2007104736 A | 4/2007 |
| JP | 2012222958 A | 11/2012 |
| JP | 2012228075 A | 11/2012 |
| JP | 2018078678 A | 5/2018 |

* cited by examiner

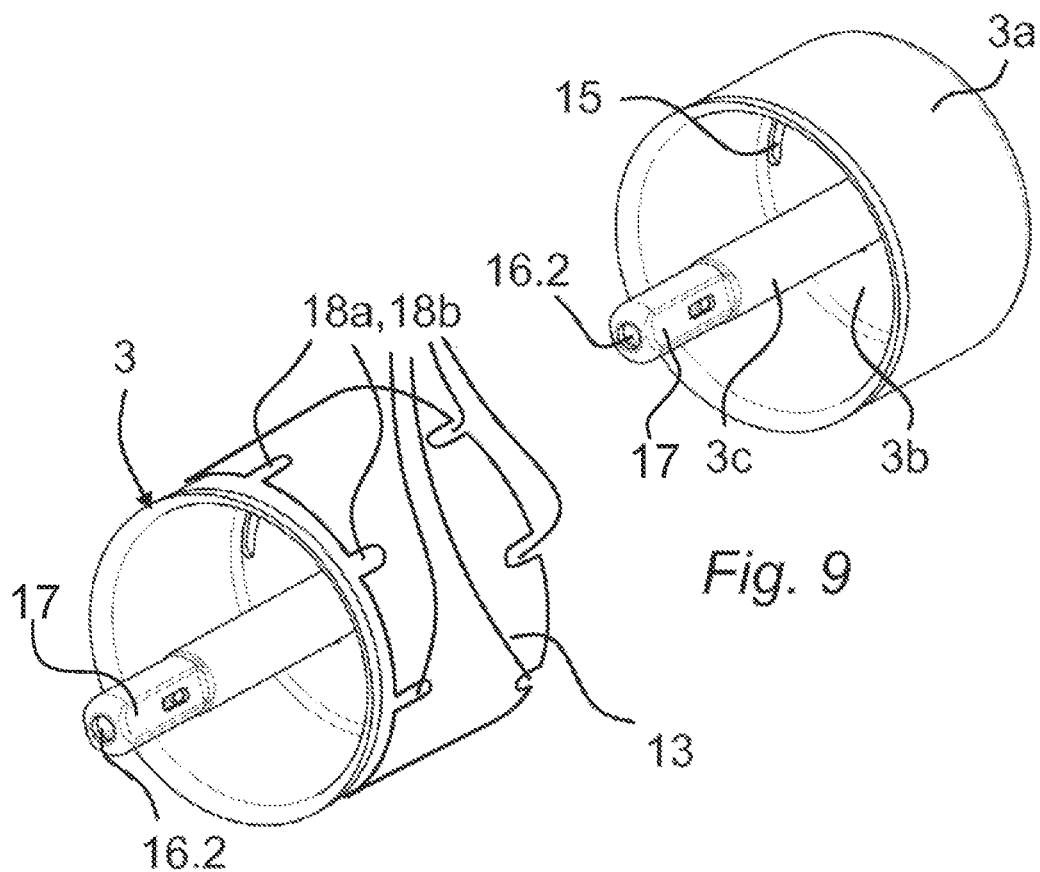
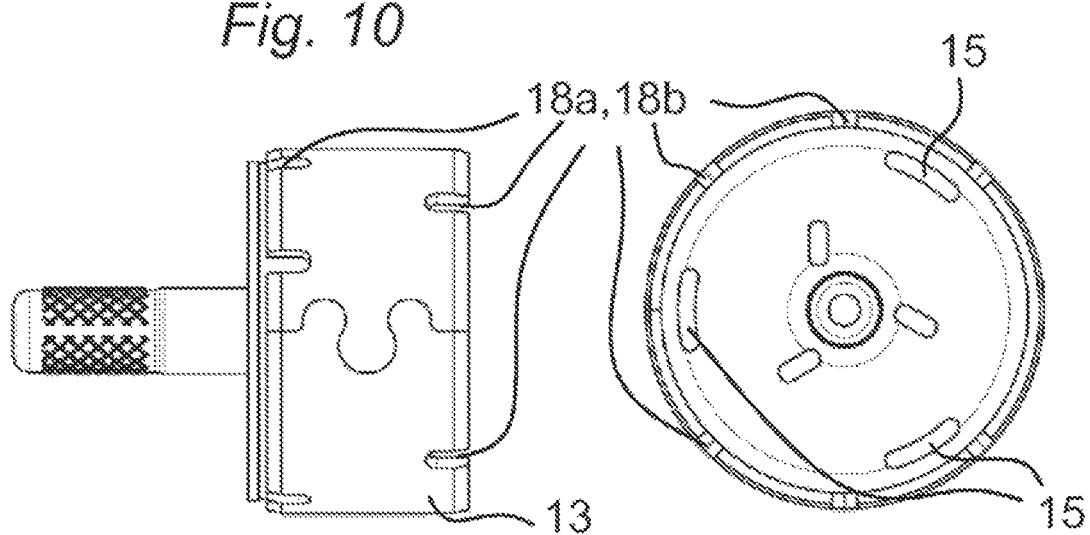

ELECTRIC DRIVE MOTOR, WET ROTOR PUMP AND HOUSEHOLD APPLIANCE

BACKGROUND OF THE INVENTION

Field of the Invention

The invention relates to an electric drive motor having a stator with at least one electrically actuatable stator winding, and a rotor which is mounted in a rotationally drivable manner in the field of the at least one actuatable stator winding so as to leave free an annular gap, having a motor shaft and a magnet carrier which is arranged coaxially in relation to the motor shaft and has at least one permanent magnet which is arranged on an outer periphery of the magnet carrier. The invention also relates to an associated wet rotor pump and to a household appliance having an electric drive motor of this kind.

DE 10 2014 202 572 A1 describes an electric drive motor for a pump having an electrically actuatable stator winding and a rotor which is mounted in a rotationally drivable manner in the field of the stator winding so as to leave free an annular gap, which has a motor shaft, a magnet carrier seated on the motor shaft and a number of permanent magnets arranged distributed around at least one outer surface of the magnet carrier, which each have at least one outer surface and are fastened to the magnet carrier by means of a plastic body molded around the magnet carrier, wherein the permanent magnets, on their outer surface facing towards the annular gap, are held by the plastic body in a form fit and/or force fit in such a way that at least a part of these outer surfaces is left free.

DE 10 2016 219 974 B3 describes an electric drive motor having a stator with pole shoes and at least one electrically actuatable stator winding and a permanent magnet rotor mounted in a rotationally drivable manner in the field of the stator winding so as to leave free an annular gap, which has a motor shaft and a magnet carrier seated on the motor shaft manufactured as an injection-molded part, on which a number of separate permanent magnets are arranged distributed around a periphery, wherein the permanent magnet rotor has a tensioning facility that is embodied to push the number of permanent magnets outwards in radial directions against an inner wall of a cavity of an injection mold of the magnet carrier during the injection molding of the magnet carrier.

SUMMARY OF THE INVENTION

The object of the invention is to create an electric drive motor with a rotor which has at least one permanent magnet, of which the structural complexity and for which the production costs are optimized, so that straightforward and simple production is possible.

The object is achieved in accordance with the invention by an electric drive motor having a stator with at least one electrically actuatable stator winding, and a rotor which is mounted in a rotationally drivable manner in the field of the at least one actuatable stator winding so as to leave free an annular gap, having a motor shaft and a magnet carrier which is arranged coaxially in relation to the motor shaft and has at least one permanent magnet which is arranged on an outer periphery of the magnet carrier, wherein the motor shaft and the magnet carrier are embodied as an integral design by the motor shaft and the magnet carrier being jointly produced from an individual initial metal sheet by shaping to form an integral shaped rotor body.

The at least one permanent magnet can be embodied as a permanent magnet. The permanent magnet can feature a hard-magnetic material, by which a permanent magnetic field can be provided. The at least one permanent magnet can be embodied in one piece or in a number of pieces and can be produced in particular from hard-magnetic ferrites. Generally, in the case of a number of permanent magnets, these permanent magnets are preferably all embodied identically. Each of the number of permanent magnets can have a circle sector-shaped design.

The field is an area embodied as a magnetic field, which is created by magnetic material and/or by electric currents. The field can be created by a stator and act magnetically on the at least one permanent magnet of the rotor mounted in a rotationally drivable manner. Through the magnetic effect of the field on the at least one permanent magnet of the rotor mounted in a rotationally drivable manner a controlled circular movement of the rotor or of the motor shaft of the rotor mounted in a rotationally drivable manner can be produced.

The magnet carrier of the electric drive motor can have one or more permanent magnets arranged distributed evenly around a periphery, which are fastened to the magnet carrier. The permanent magnets can be arranged evenly distributed around the periphery of the magnet carrier. In this regard the permanent magnets arranged evenly distributed around the periphery of the magnet carrier can supplement each other, apart from slight gaps, to form a circumferential ring of magnets assembled from a number of pieces.

The annular gap describes the area of the electric drive motor that forms the distance between the stator and the rotor mounted in a rotationally drivable manner. This area should preferably have a small distance between the stator and the rotor mounted in a rotationally drivable manner so that the field of the stator can exert a direct influence on permanent magnets of the magnet carrier of the rotor mounted in a rotationally drivable manner.

The stator represents the non-moving part of the electric drive motor, which has a predetermined number of pole shoes, i.e. stator poles. The stator can have at least two or more stator poles, which have an unchanging position on the stator during use. The stator poles can have electrically actuatable stator windings so that a turning and circular movement can be imparted to the rotor mounted in a rotationally drivable manner.

The rotor mounted in a rotationally drivable manner represents the moving part of the electric drive motor, which has the magnet carrier which has the at least one permanent magnet. The rotor mounted in a rotationally drivable manner can have a bearing on one side, which makes possible a rotational movement carried out in the annular gap. The bearing of the rotor mounted in a rotationally drivable manner can have a single radial sliding bearing for example, which can be embodied to support the rotor mounted in a rotationally drivable manner not only radially but especially also in an axial direction.

A production method that in particular comprises the shaping techniques of rolling, open die forging, drop forging, impact extrusion, extrusion, deep drawing and bending is understood as shaping. In such processes an initial material is adapted to its shape by the different production processes, which requires a degree of plasticity. In particular the production process of deep drawing can be used for shaping.

The initial metal sheet has the possibility of being modified elastically without losing its material integrity as well as in addition the capability of conducting magnetic energy.

The integral molded rotor body can thus be shaped, in particular deep drawn, from the initial metal sheet, in particular an integral, flat initial metal sheet and the shaped integral shaped rotor body in this case can form the motor shaft and the magnet carrier.

The feature of the integral shaped rotor body, which is supported rotatably with a bearing so that it a motor shaft segment at an intermediate section arranged axially between the first end section of the motor shaft section and the second end section of the motor shaft section carries the motor shaft section means in particular that the bearing arranged in the intermediate section of the motor shaft section can be the sole bearing which supports the motor shaft section in a rotatable manner. The motor shaft section can accordingly be guided rotatably and supported rotatably exclusively by this single bearing, which carries the motor shaft section at its intermediate section, in particular in relation to a motor housing. The integral shaped rotor body can in this regard just be supported on one side.

The shaping production method enables the integral shaped rotor body to be produced from an initial metal sheet, which forms the motor shaft and the magnet carrier as an integral design. Since the motor shaft and the magnet carrier are embodied as an integral design, wherein the motor shaft and the magnet carrier are produced from a single initial metal sheet by shaping it into an integral shaped rotor body, the complexity of the assembly of the electric drive can be reduced and/or the production costs can be optimized.

The integral shaped rotor body can have a motor shaft section formed by deep drawing and a magnet carrier section formed by deep drawing.

The deep drawing production method describes the modification of a preferably flat initial metal sheet, which can be understood in the context of the invention as a basic material. The basic material can be shaped on one side or on both sides by tension and/or pressure. The deep drawing process in this case can be implemented by a tool, by an effective medium such as e.g. water and/or by an effective energy such as e.g. magnetic energy, in particular by a tool. Through the process of deep drawing the basic material, which can also be understood as a semi-finished product, can be made into a defined shape, which in particular can be predetermined by the tool. After the actual process of deep drawing, by additional processes such as punching or cutting, beads, slits, openings and/or breakthroughs can be introduced in the shaped semi-finished material, for instance.

The motor shaft section forms a motor shaft which is connected as an integral design to the magnet carrier section, which forms a magnet carrier. The motor shaft section can be used for force transmission. The magnet carrier section can be used to accommodate permanent magnets.

The integral shaped rotor body can have a connecting section made by deep drawing, which connects the motor shaft section to the magnet carrier section as an integral design.

The connecting section represents the area between the motor shaft section and the magnet carrier section, which, as a result of the production method, forms the integral shaped rotor body. Through the inventive implementation of the production of the integral shaped rotor body a rotor mounted in a rotational manner can be created, which through its integral construction consisting of the magnet carrier section, the motor shaft section and the connecting section, makes mounting of a rotor mounted in a rotationally drivable manner consisting of separate components of the rotor mounted in a rotationally drivable manner unnecessary.

The motor shaft section can be connected to the magnet carrier section at an axial end of the integral shaped rotor body and the magnet carrier section in this case can extend from this axial end at least essentially coaxially to the axis of the motor shaft section.

The motor shaft section embodies a first open end, to which a component to be driven, such as for example a pump wheel, can be attached and/or on which a bearing can be arranged. The motor shaft section moreover embodies a second end lying opposite the first open end, which can have an integral transition into a connecting section. The connecting section forms an integral connection with the magnet carrier section, which extends coaxially in relation to the motor shaft section in the direction of the first end of the motor shaft section. The motor shaft section, the connecting section and the magnet carrier section form the integral shaped rotor body.

The electric drive motor can have a separately produced magnetically conducting supplementary ring, which can be fastened to the surface of the magnet carrier section and on which the at least one permanent magnet is arranged. The use of a separately produced magnetically conducting supplementary ring can be expedient especially when for example the permanent magnets are magnetized in such a way that a yoke is needed as a ferrous return. As an alternative or in addition the use of a separately produced magnetically conducting supplementary ring can be especially expedient when the molded, especially deep drawn shaped rotor body is made of a non-ferrous material, such as aluminum or its alloys for example.

The magnetically conducting supplementary ring can be embodied as an integral design or be assembled from a number or parts, in particular bent from flat material. The magnetically conducting supplementary ring can in particular have the shape of a straight hollow circular cylinder.

Within the framework of the invention it may be possible to use different embodiment variants of the magnetic supplementary ring. In a first embodiment variant the magnetically conducting supplementary ring can have an axially larger outside surface than the magnet carrier section. In a second embodiment the magnetically conducting supplementary ring can have an axially smaller outside surface than the magnet carrier section. In a third embodiment the magnetically conducting supplementary ring can have an axially equal outside surface to the magnet carrier section. Regardless of the form of embodiment used the at least one permanent magnet can be arranged on the magnetically conducting supplementary ring and the magnetically conducting supplementary ring can be fastened to the magnet carrier section.

The magnetically conducting supplementary ring can be fastened to the magnet carrier by gluing or by insert molding with plastic material. It is possible to fit the magnetically conducting supplementary ring on the magnet carrier independently of the embodiment variants projecting axially beyond the outside surface of the magnet carrier.

The magnetically conducting supplementary ring can increase the mechanical rigidity of the shaped rotor body for example, be embodied as a magnetic yoke, in particular if a dipole magnet is used or, depending on the form of embodiment, make it possible to accommodate permanent magnets with a larger surface area.

The at least one permanent magnet can be fastened to the magnet carrier section by being glued on by means of an adhesive, in particular a magnetic adhesive. The magnetic adhesive can for example have a binding agent, which hardens from the fluid state, into which metal particles are bound.

The magnetic adhesive can be an adhesive, which can join materials in a form fit using surface adhesion or cohesion, whereby a compound material is produced. In this case the adhesive can in particular involve a physically binding adhesive, a chemically hardening adhesive or an adhesive without a hardening mechanism. The magnetic glue, in addition to the adhesive, can for example also have particles that possess magnetic characteristics. The particles can improve attachment and/or the adhesive performance of the magnetic adhesive when joining magnetic materials, i.e. the permanent magnets to the rotor.

The at least one permanent magnet can be fitted to the magnet carrier section by the production process of gluing, in this way the at least one permanent magnet can be accommodated on the magnet carrier section by a material-to-material bond, so that a fixed connection joins the at least one permanent magnet to the magnet carrier section.

The magnet carrier section and/or the magnetically conducting supplementary ring can have at least one pocket and/or a recess, which forms a flow channel for conveying plastic material into a gap between an outer surface wall of the magnet carrier section and the rear side of the at least one permanent magnet facing towards the magnet carrier section during an insert molding of the integral shaped rotor body with the plastic material, in that by means of the at least one pocket and/or the at least one recess during insert molding of the integral shaped rotor body the plastic material can flow or can be pushed into the gap between an outer surface wall of the magnet carrier section and the rear side of the at least one permanent magnet facing towards the magnet carrier section, the still fluid plastic material pushes the at least one permanent magnet radially outwards during the molding process, in particular against an inner wall of an injection mold. When a number of permanent magnets are used this enables it to be prevented for example or at least largely avoided that the outer surfaces of the permanent magnets are covered by the plastic material. Since as a result of the forwards pressure into the gap the permanent magnets are pushed radially outwards, the permanent magnets lie with their outer surfaces flush with the inner wall of the injection mold and no plastic material can get between the outer surfaces of the permanent magnets and the inner wall of the injection mold. After the hardening of the plastic material the at least one permanent magnet is or the number of permanent magnets are held in a material-to-material bond on the outer surface wall of the integral shaped rotor body or the magnet carrier section.

The at least one permanent magnet can be fastened to the magnet carrier section by the shaped rotor body being insert molded by means of a plastic material.

The insert molding can be used for fastening the permanent magnets. In this case the plastic material is injected around the permanent magnets and beneath the permanent magnets with the aid of the at least one pocket and/or recess. This enables a consistent gap between the permanent magnets and the stator or in the annular gap to be ensured, as well as a solid seating of the permanent magnets on the magnet carrier section.

The integral shaped rotor body can have at least one end face side breakthrough which forms an overflow opening, which is embodied for the overflow of plastic material from one side of the integral shaped rotor body to an opposite side of the integral shaped rotor body during an insert molding of the integral shaped rotor body with the plastic material.

The at least one breakthrough can be embodied as a hole, which has an opening that can have any geometrical shape. In particular the hole can have the geometrical shape of an ellipse, which can be straight or curved.

The at least one breakthrough has the function of an overflow opening or a flow channel, since the breakthrough makes it possible for plastic material to flow from one side of the integral shaped rotor body to another side of the integral shaped rotor body.

The motor shaft section can have a free shaft end, which is embodied for bearing a running wheel on the motor shaft section and has a knurling and/or at least one flat portion on the outer surface wall of the shaft end, for torsion-proof bearing of the running wheel on the motor shaft section.

The knurling is embodied as a crossed line shaped indentation of the surface of the motor shaft section and is made for example by milling, pressing or stamping on the motor shaft section. In this case the knurling is intended to increase the friction effect of the motor shaft section, so that slippage of a component to be driven, such as a pump wheel in particular, which is fitted to the motor shaft section, is prevented.

The flat portion is embodied as a modification of the surface contour of the motor shaft section and changes the cross-sectionally circular shape of the motor shaft section to form a circular section or two circular sections. The modification of the motor shaft section should prevent the component to be driven, such as in particular the pump wheel, which is attached to the motor shaft section, from slipping.

The initial metal sheet, which forms an integral shaped rotor body, can have magnetically conducting properties.

The initial metal sheet can in particular have soft magnetic materials, which are able to be slightly magnetized in a magnetic field or which reinforce an external magnetic field. Within the framework of the invention a magnetic field of the at least one permanent magnet, which is arranged on the magnet carrier section of the integral shaped rotor bodies, can be increased by an initial metal sheet consisting of soft magnetic materials, which forms the integral shaped rotor body.

The motor shaft section can be embodied as a hollow shaft, which has an opening at the opposite shaft ends of the motor shaft section in each case for forming a coaxial flow channel.

The hollow shaft can be used as a flow channel, through which a fluid can flow during operation of the motor shaft or when the motor shaft is at rest. A throughflow of fluid can cool the electric drive motor and/or make it possible to meet the need for space for lines to convey the material to be conveyed, in particular the fluid.

The object is also achieved by a wet rotor pump, having a pump chamber wall, which delimits a wet space of the wet rotor pump, a pump wheel mounted rotatably in the wet space and an electric drive motor driving the pump wheel, according to one or more of the forms of embodiment described.

A wet rotor pump, especially within the framework of the invention, can be understood as a pump assembly that, as well as a pump wheel, and a pump housing, also comprises an electric drive motor, in particular a brushless dc motor, of which the rotor mounted in a rotationally drivable manner or shaped rotor body rotates in the fluid medium to be conveyed. The medium to be conveyed in this case is fluid conveyed by the pump wheel of the wet rotor pump. For example in the case of a dishwasher as a household appliance the medium to be conveyed can be what is known as the rinsing liquor. For example in the case of a washing machine as a household appliance the medium to be conveyed can be what is known as the wash liquor. In the wet rotor pump the rotor mounted in a rotationally drivable manner or shaped rotor body rotating in the medium to be conveyed can be separated from the stator of the electric drive motor in a fluid-tight manner by means of the pump chamber wall. In this regard the stator is located in a dry area of the wet rotor pump, i.e. hydraulically separated from the wet space in which the rotor mounted in a rotationally drivable manner is rotating.

Through the for example radial sliding bearing the motor shaft or the motor shaft section is fixed in an exact coaxial position in relation to the pump chamber wall and the stator. To this end the bearing surrounds the intermediate section of the motor shaft or the motor shaft section completely. Because of the function of the pump wheel, during the rotation of the pump wheel and thus during the rotation of the motor shaft or of the motor shaft section, by the pump wheel arranged in the medium to be conveyed in particular within the wet space, an axial force is introduced in an axial direction to the motor shaft or the motor shaft section. This axial force in an axial direction is accommodated by the axial bearing.

In the case of the wet rotor pump, the bearing can have a bearing shield connected permanently to the pump chamber wall of the wet rotor pump, said bearing shield bearing a bearing seat, in which a bearing bush is embodied, which comprises a boss in which the intermediate section of the motor shaft or of the motor shaft section is rotationally mounted.

The bearing shield can be embodied as a component which is separate from the pump chamber wall and/or from the pump housing, wherein the bearing shield can be inserted, in particular pressed, into a circular cylindrical inner seat. In this regard the bearing shield can be permanently connected as a separate component to the pump chamber wall.

The pump housing or a part of the housing of a multi-part pump housing can feature the pump chamber wall. This can mean that the pump chamber wall is fastened as a separate component to the pump housing or to the part of the housing. Alternatively this can mean that the pump chamber wall is embodied integrally with the pump housing or with the part of the housing. In the area of the stator and of the rotor mounted in a rotationally drivable manner or of the shaped rotor body the wall thickness of the pump chamber wall can be embodied especially small. The pump chamber wall in this case extends in this regard through the annular gap that separates the stator from the rotor mounted in a rotationally drivable manner or from the shaped rotor body and in which the field of the electric drive motor acts in accordance with its function.

The bearing seat of the bearing shield can have a circular cylindrical inner wall and the bearing bush in this case can have a corresponding circular cylindrical outer surface wall which corresponds to the circular cylindrical inner wall of the bearing shield and is embodied in such a way that the bearing bush is inserted with an exact fit into the bearing seat.

The bearing shield can form a dividing wall that separates a first part space of the wet space in which the rotor mounted in a rotationally drivable manner or the shaped rotor body is arranged from a second part space of the wet space in which the pump wheel is arranged. In this regard the medium to be conveyed flows through both the first part space and also the second part space. To this end the flow channel of the hollow motor shaft can transport the medium to be conveyed from the first part space into the second part space.

The pump wheel can be fastened to the shaft end of the motor shaft section of the integral shaped rotor body.

The pump wheel can be used for movement of fluids. To this end the pump wheel must have blades in a form that makes a movement of the fluids possible.

The object is also achieved by a household appliance, which can in particular be a dishwasher, a washing machine, a dryer or an extractor hood, having an electric drive motor and/or a wet rotor pump, according to one or more of the forms of embodiment described.

Specific exemplary embodiments of the invention are explained in greater detail in the description given below, which refers to the enclosed figures. Specific features of these examples of exemplary embodiments, regardless of the actual context in which they are mentioned, if necessary, also considered individually or in further combinations, represent general features of the invention.

BRIEF DESCRIPTION OF THE SEVERAL VIEWS OF THE DRAWING

FIG. 9 shows a perspective diagram of the shaped rotor body embodied as an integral design with a motor shaft section embodied as a hollow shaft, which moreover has a flat portion on the outside surface wall of the shaft end;

FIG. 10 shows a perspective diagram of the shaped rotor body embodied as an integral design in accordance with FIG. 9 with a supplementary ring placed thereon;

FIG. 11 shows a side view of an alternate form of embodiment of a shaped rotor body embodied as an integral design, which has knurling on the outer wall of the shaft end, with a supplementary ring placed thereon, and FIG. 12 shows a front overhead view of the shaped rotor body in accordance with FIG. 11.

DETAILED DESCRIPTION OF THE INVENTION

Figure 1:
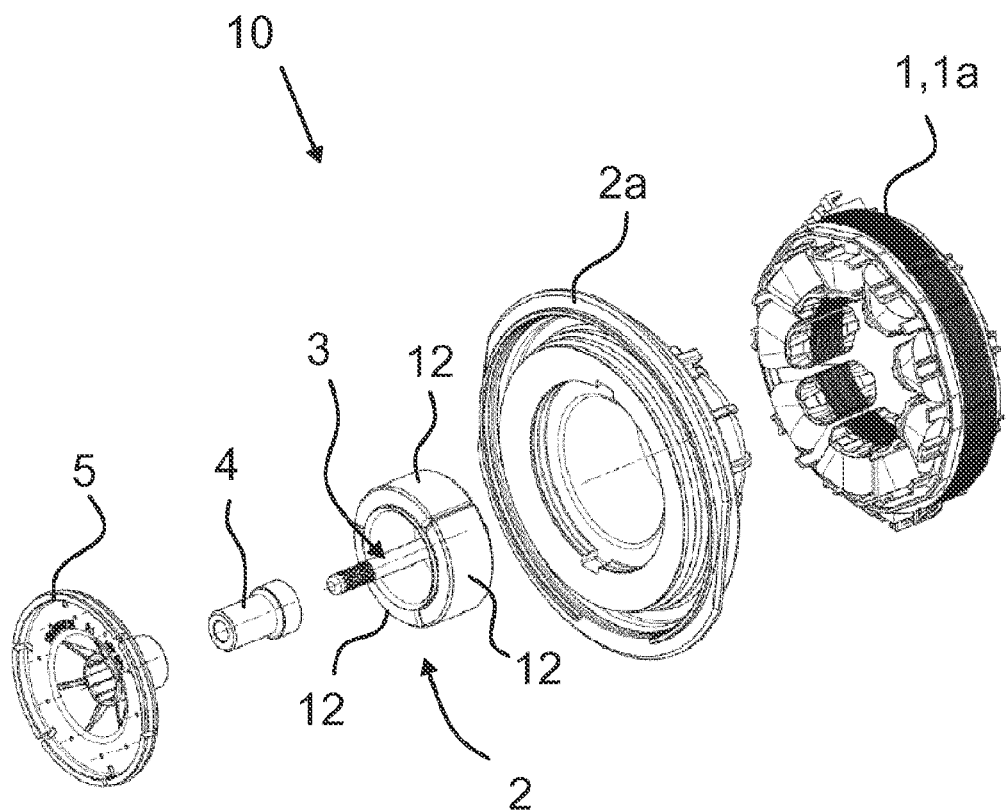
FIG. 1 shows an exploded view of the design of an example of an electric drive.

FIG. 1 shows the structure of an example of an electric drive 10. In the case of this exemplary embodiment the electric drive 10 has a stator 1 with a stator winding 1*a*. The stator 1 is arranged on an outer side of a rotor housing 2*a*, which is embodied to accommodate a rotor 2 comprising an inventive integral shaped rotor body 3 inside the annular stator 1. The integral shaped rotor body 3 is shown in the form of embodiment in accordance with FIG. 1 with three permanent magnets 12 for example. The shaft of the integral shaped rotor body 3 sits in a sliding bearing bush 4. The integral shaped rotor body 3 and the sliding bearing bush 4 are held in position in the rotor housing 2*a* by a terminating bearing end shield 5.

Figure 2:
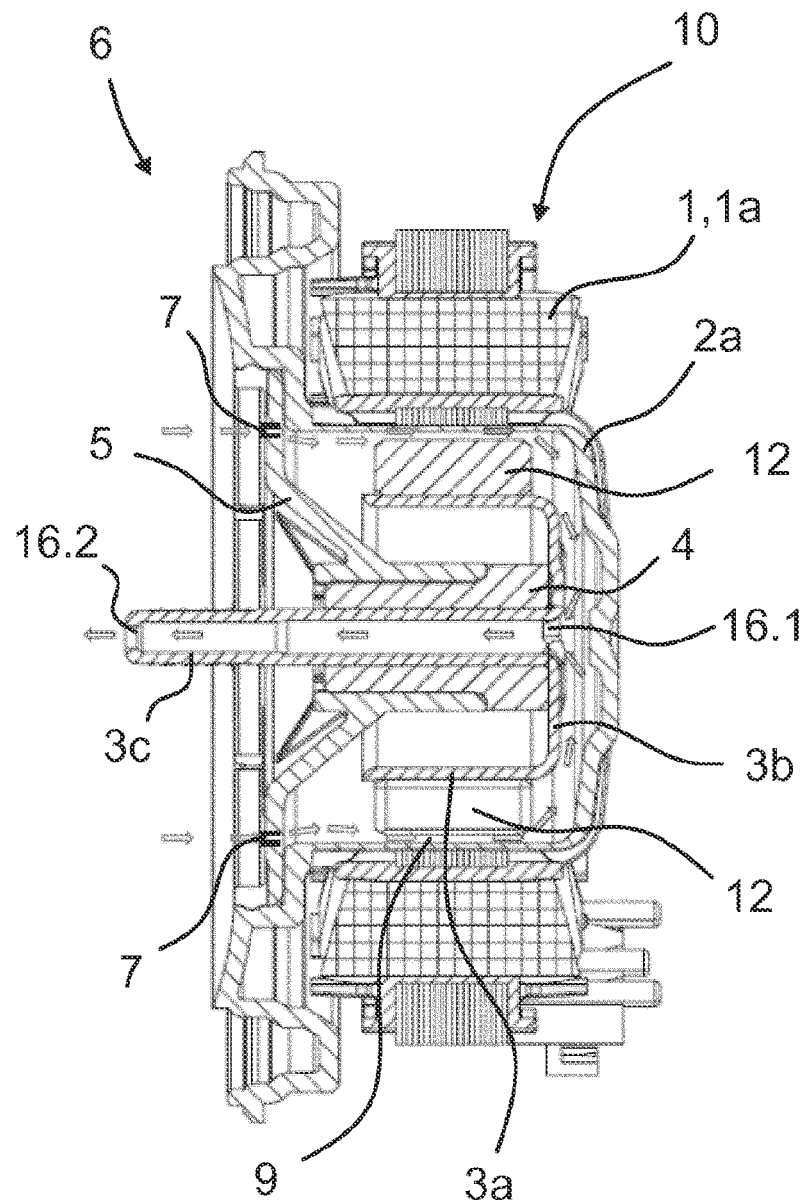
FIG. 2 shows a sectional representation of a wet rotor pump with the inventive electric drive motor.

FIG. 2 shows a use of the electric drive 10 in a wet rotor pump 6. The wet rotor pump 6 has the stator 1, which is fastened to an outer wall of the rotor housing 2*a*. Within the rotor housing 2*a* the rotor 2 with its integral shaped rotor body 3 is mounted rotatably by means of the sliding bearing bush 4. The integral shaped rotor body 3, in the form of embodiment shown in FIG. 2, is embodied with a motor shaft section 3*c* in the form of a hollow shaft. A bearing end shield 5 of the wet rotor pump 6 has bearing end shield openings 7 through which a fluid flows into the wet chamber 8 of the wet rotor pump 6. Positioned on the bearing end shield 5 is the sliding bearing bush 4 supporting the integral shaped rotor body 3. The fluid flows through the wet chamber 8, as indicated by the arrows in FIG. 2, and gets to an end-face side opening 16. 1 of the hollow shaft of the integral shaped rotor body 3 via an annular gap 9 between the permanent magnets 12 and the rotor housing 2*a* and, after flowing through the hollow shaft of the integral shaped rotor body 3, comes out again at the shaft-end side opening of the hollow shaft of the integral shaped rotor body 3.

Figure 3:
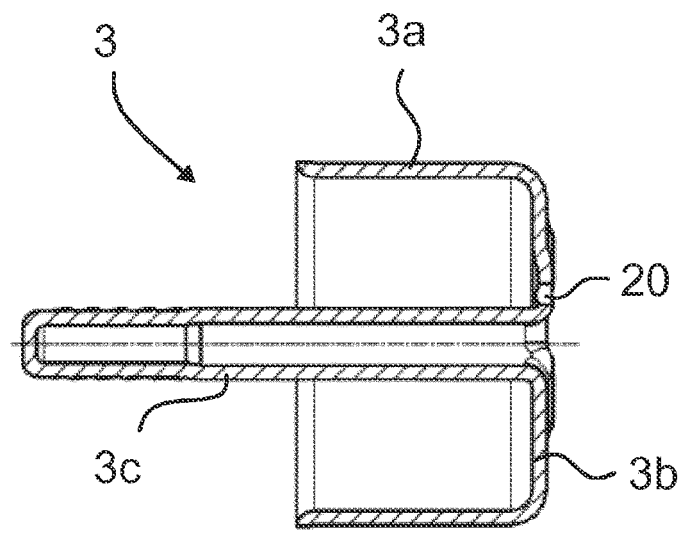
FIG. 3 shows a longitudinal sectional representation of an inventive shaped rotor body embodied as an integral design.

FIG. 3 shows the inventive integral shaped rotor body 3, which has a magnet carrier section 3*a*, a connecting section 3*b* and the motor shaft section 3*c*. The connecting section 3*b* connects the magnet carrier section 3*a* to the motor shaft section 3*c* as an integral design.

Figure 4:
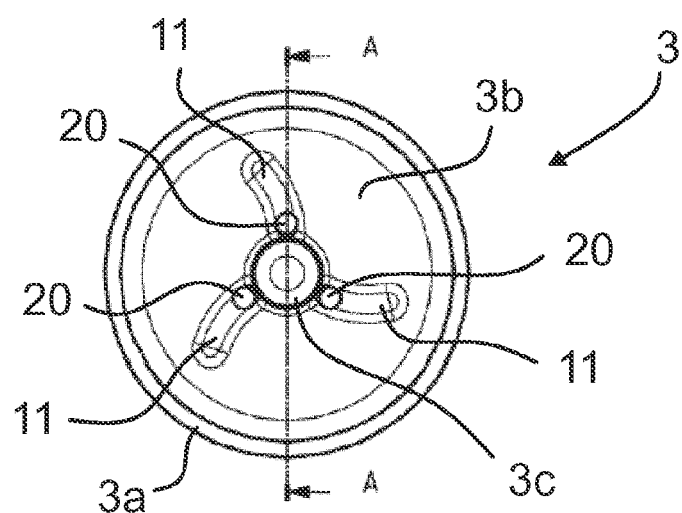
FIG. 4 shows an axial overhead view of the inventive shaped rotor body embodied as an integral design in accordance with FIG. 3.

FIG. 4 shows the end face side on the connecting section 3*c* of the integral shaped rotor body 3. In the case of the present exemplary embodiment the connecting section 3*c* has, for instance, three curved, grooved or fluted channels 11 which open out into three corresponding holes 20, via which fluid can overflow from outside the integral shaped rotor body 3 into the inside of the hollow cylindrical magnet carrier section 3*a*. In FIG. 3 this corresponds to an overflowing of fluid via the hole 20 from the left side of the connecting section 3*b* to the right side of the connecting section 3*b*.

Figure 5:
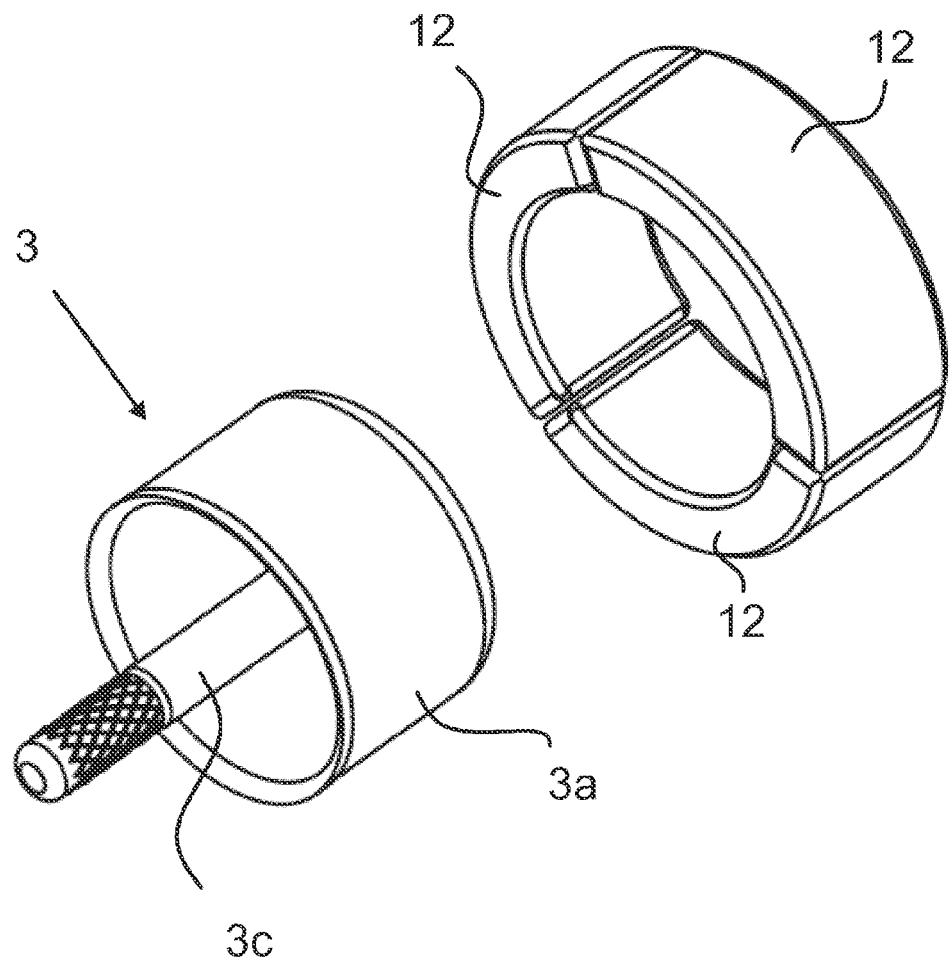
FIG. 5 shows an exploded view of the shaped rotor body embodied as an integral design and three permanent magnets, which supplementing each other form a magnet ring, which is placed on the shaped rotor body.

FIG. 5 shows an example of the structure of the integral shaped rotor body 3 and of the at least one permanent magnet in an exploded diagram, wherein the permanent magnets 12 combined form a magnet ring.

Figure 6:
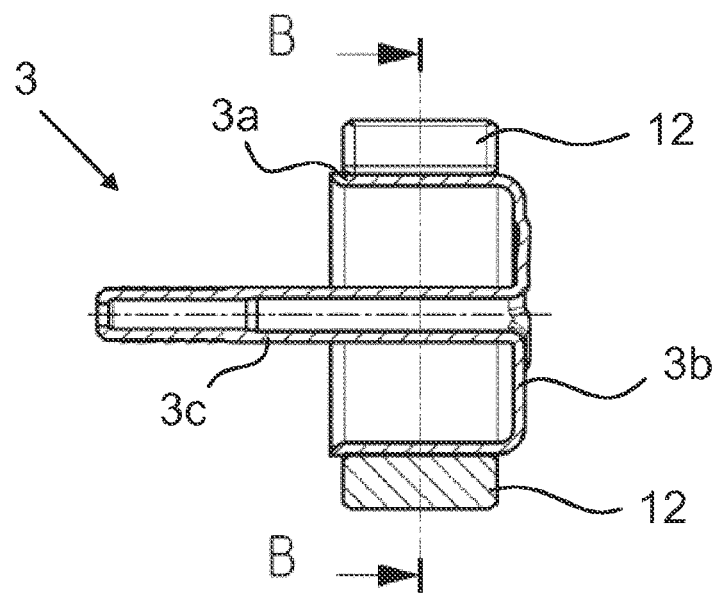
FIG. 6 shows a longitudinal sectional representation of the shaped rotor body embodied as an integral design with the permanent magnets, which form a three-part magnet ring.
Figure 7:
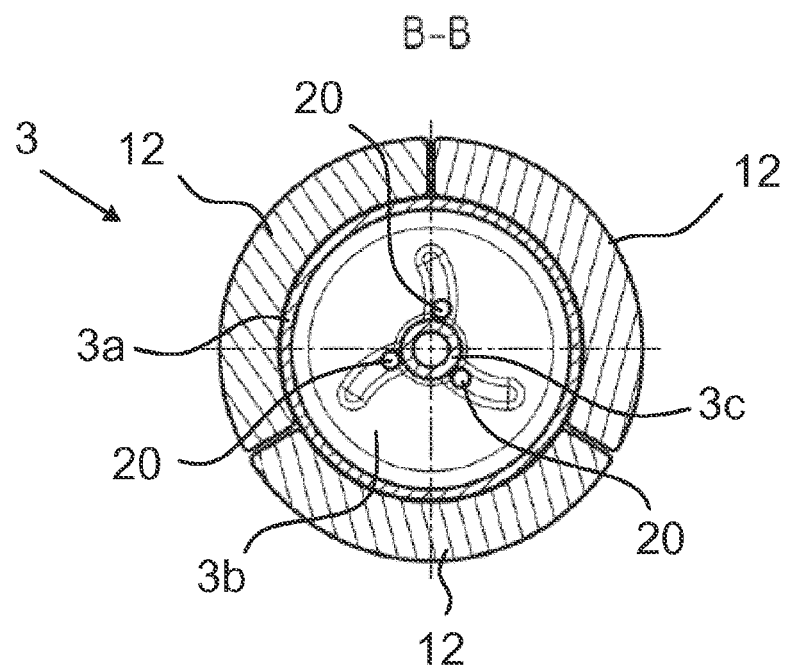
FIG. 7 shows a cross-sectional representation of the shaped rotor body embodied as an integral design with the permanent magnets, which form the three-part magnet ring.

FIG. 6 shows the integral shaped rotor body 3, upon which the permanent magnets 12 are arranged, in a sectional diagram. FIG. 7 shows a sectional diagram of the integral shaped rotor body 3 in accordance with FIG. 6 on which the permanent magnets 12 are arranged.

Figure 8:
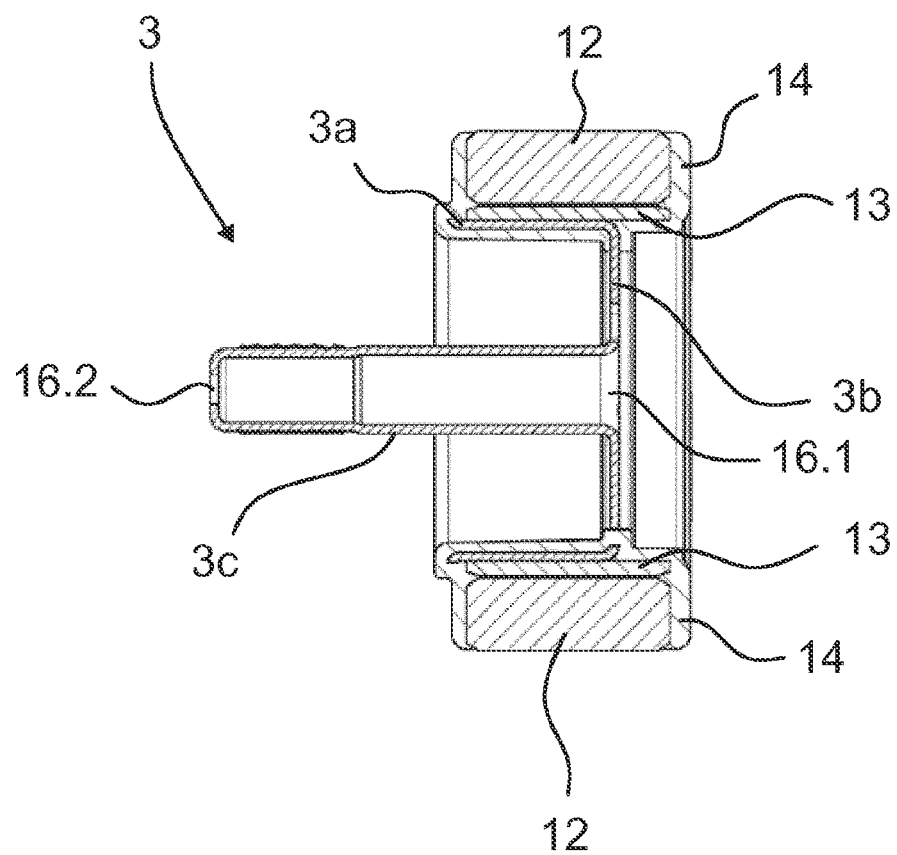
FIG. 8 shows a longitudinal sectional representation of an alternate form of embodiment of a shaped rotor body embodied as an integral design with the permanent magnets, which are embodied as a three-part magnet ring, and a separately produced magnetically conducting supplementary ring.

FIG. 8 shows an alternate form of embodiment of an integral shaped rotor body 3, which has the magnet carrier section 3*a*, the connecting section 3*b* and the motor shaft section 3*c*. Here the connecting section 3*b* is also the integral connection of the magnet carrier section 3*a* to the motor shaft section 3*c*. However an additional magnetically conducting supplementary ring 13 is arranged on the magnet carrier section 3*a*. The permanent magnets 12 are arranged on the magnetically conducting supplementary ring 13. The magnetically conducting supplementary ring 13 has an axially larger outer surface than the magnet carrier section 3*a*, whereby the end side of the magnetically conducting supplementary ring projects beyond the magnet carrier section. The magnet carrier section 3*a*, the magnetically conducting supplementary ring 13 and the permanent magnets 12 have a plastic material 14 insert molded around them.

FIG. 9 shows the integral shaped rotor body 3, which has a visible breakthrough on the connecting section 3*b*. As can be seen in FIG. 12 in particular, three breakthroughs 15 can be provided on the connecting section 3*b*, via which during an insert molding of the shaped rotor body 3 with plastic material 14, said material can overflow from the outside of the integral shaped rotor body 3 into the inside of the hollow cylindrical magnet carrier section 3*a*, in order to also be able to insert mold around the inner wall of the integral shaped rotor body 3. The integral shaped rotor body 3 is moreover provided with a flat portion 17 on the outer surface wall of the shaft end of the motor shaft section 3*c*, which forms a torsion proofing for a component, such as a pump wheel for example, to be fastened to the motor shaft section 3*c*. In the case of the present exemplary embodiment, the shaft end of the motor shaft section 3*c* also has a shaft-side opening 16.2.

FIG. 10 shows the integral shaped rotor body 3 with a supplementary ring 13 pressed onto the magnet carrier section 3*a*. In the case of the present exemplary embodiment the supplementary ring 13 has a number of pockets 18*a* or recesses 18*b*, via which, during an insert molding of plastic material 14 around the shaped rotor body 3, this plastic material, still in its fluid state, can penetrate between an outer surface wall of the magnet carrier section 3*a* of the integral shaped rotor body 3 and the permanent magnets 12, in order to push the permanent magnets 12 radially outwards within the injection mold during an insert molding of the shaped rotor body 3, so that the outer surface walls of the permanent magnets 12 remain free from plastic material 14.

LIST OF REFERENCE CHARACTERS

1 Stator
2 Stator winding
2 Rotor
2*a* Rotor housing
3 Integral shaped rotor housing
3*a* Magnet carrier section
3*b* Connecting section
3*c* Motor shaft section
4 Sliding bearing bush
5 Bearing end shield
6 Wet rotor pump
7 Bearing end shield openings
8 Wet chamber
9 Annular gap
10 Drive
11 Channels
12 Permanent magnets
13 Magnetically conducting supplementary ring
14 Plastic material
15 Breakthrough
16.1 End face opening
16.2 Shaft end-face side opening
17 Flat portion
18*a* Pockets
18*b* Recesses
20 Holes

The invention claimed is:
1. An electric drive motor, comprising:
a stator with at least one electrically-actuatable stator winding;

a rotor rotatably mounted in a field of said stator winding and leaving free an annular gap;

a motor shaft and a magnet carrier, said magnet carrier being arranged coaxially in relation to said motor shaft and having at least one permanent magnet arranged on an outer periphery of said magnet carrier;

said motor shaft and said magnet carrier being integrally formed in one piece, with said motor shaft and said magnet carrier having characteristics of having been jointly produced from a single initial metal sheet formed into an integrally shaped rotor body; and said integrally shaped rotor body having a motor shaft section and a magnet carrier section;

said integrally shaped rotor body having a connecting section at an axial end face of said integrally shaped rotor body integrally connecting said motor shaft section to said magnet carrier section;

said magnet carrier section extending substantially coaxially to an axis of said motor shaft section from said connecting section, and said connecting section extending substantially perpendicular to an axis of said motor shaft section between said motor shaft section and said magnet carrier section;

said integrally shaped rotor body having at least one end face side breakthrough on said connecting section; and said integrally shaped rotor body having at least one channel extending substantially radially at least partially between said motor shaft section and said magnet carrier section formed in said connecting section, said integrally shaped rotor body having a hole at a radial end of said at least one channel in said connecting section configured for fluid to overflow from an outside of the integral shaped rotor body into the inside of the hollow cylindrical magnet carrier section.

2. The electric drive motor according to claim 1, further comprising a separately produced magnetically conducting supplementary ring fastened to a surface of said magnet carrier section of said integrally shaped rotor body, and wherein said at least one permanent magnet is arranged on said supplementary ring.

3. The electric drive motor according to claim 2, wherein said magnet carrier section and/or said-magnetically conducting supplementary ring is formed with at least one pocket and/or a recess, each forming a flow channel for conveying plastic material in a gap between an outer surface wall of said magnet carrier section and a rear side of said at least one permanent magnet facing towards said magnet carrier section during an insert molding of said integrally shaped rotor body with the plastic material.

4. The electric drive motor according to claim 1, wherein said at least one permanent magnet is glued to said magnet carrier section by way of a magnetic adhesive.

5. The electric drive motor according to claim 1, wherein said at least one permanent magnet is fastened to said magnet carrier section by insert molding of said integrally shaped rotor body with a plastic material.

6. The electric drive motor according to claim 5, wherein said at least one end-face side breakthrough forms an overflow opening for an overflow of plastic material from one side of said integrally shaped rotor body to an opposite side of said integrally shaped rotor body during an insert molding of said integrally shaped rotor body with the plastic material.

7. The electric drive motor according to claim 1, wherein said motor shaft section has a free shaft end configured for bearing a running wheel on said motor shaft section, and an outer surface of said free shaft end is formed with knurling and/or a flat portion for torsion-proof bearing of the running wheel on said motor shaft section.

8. The electric drive motor according to claim 1, wherein said motor shaft section is a hollow shaft formed with an opening on opposite shaft ends for forming a coaxial flow channel through said motor shaft section.

9. A wet rotor pump, comprising:
a pump chamber wall delimiting a wet space of the wet rotor pump;
a pump wheel mounted rotatably in the wet space; and
an electric drive motor according to claim 1 for rotatably driving said pump wheel.

10. The wet rotor pump according to claim 9, wherein said pump wheel is fastened to a shaft end of a motor shaft section of said integrally shaped rotor body.

11. A household appliance, comprising:
wet rotor pump having a pump chamber wall delimiting a wet space of the wet rotor pump, and a pump wheel mounted rotatably in said wet space; and
an electric drive motor according to claim 1 for rotatably driving said pump wheel in said wet space.

12. The household appliance according to claim 11 being a dishwasher, a washing machine, a dryer, or an extractor hood.

* * * * *